United States Patent [19]

Bart, Jr.

[11] Patent Number: 4,482,101

[45] Date of Patent: Nov. 13, 1984

[54] SEAT BELT RETRACTOR

[75] Inventor: John J. Bart, Jr., Washington, Mich.

[73] Assignee: General Motors Corporation, Detroit, Mich.

[21] Appl. No.: 503,826

[22] Filed: Jun. 13, 1983

[51] Int. Cl.³ .................. A62B 35/00; B65H 75/48
[52] U.S. Cl. ............................. 242/107; 242/55; 242/67.1 R
[58] Field of Search .................. 242/107–107.7, 242/47.08, 47.09, 53, 127, 67.1 R, 55; 280/806, 807; 297/475–478

[56] References Cited

U.S. PATENT DOCUMENTS

| | | | |
|---|---|---|---|
| 2,262,587 | 11/1941 | Kaempf | 242/107.1 |
| 2,682,335 | 6/1954 | Welsh et al. | 242/47.09 |
| 3,486,792 | 12/1969 | Stoffel | 242/107.2 X |
| 3,833,183 | 9/1974 | Swatzell, Jr. | 242/127 |
| 3,885,754 | 5/1975 | Delerue | 242/127 |
| 3,957,283 | 5/1976 | Pocobello | 297/475 |

FOREIGN PATENT DOCUMENTS

| | | | |
|---|---|---|---|
| 246406 | 11/1910 | Fed. Rep. of Germany | 242/55 |
| 1073781 | 6/1967 | United Kingdom | 242/67.1 R |
| 874550 | 10/1981 | U.S.S.R. | 242/55 |

Primary Examiner—John M. Jillions
Attorney, Agent, or Firm—Charles E. Leahy

[57] ABSTRACT

A seat belt retractor includes first and second spindles which are rotatably mounted on a housing in spaced apart parallel relation. The belt has one end looped around the spindles and sewn to itself to form a loop. A wind-up spring acts between one of the spindles and the housing to rotate the one spindle so that the loop of belt orbits the first and second spindles and winds the belt in successive layers in a hank on top the loop. The second spindle is preferably mounted in a slot of the housing to permit movement of the second spindle away from the first spindle. A pair of leaf springs are mounted on the housing and respectively bear against the second spindle to maintain a tension on the loop so that the rotation of the first spindle effects nonslipping orbit of the loop around the spindles. Furthermore, the spindles are preferably coated with a friction material, such as rubber. Thus, the retractor stores the belt in a hank which provides a more elongated but thinner retractor package.

3 Claims, 4 Drawing Figures

SEAT BELT RETRACTOR

The invention relates to a seat belt retractor and, more particularly, to a retractor which winds the belt about a pair of spaced apart spindles so that the belt is stored in a hank.

BACKGROUND OF THE INVENTION

Seat belts for restraining an occupant in a vehicle normally comprise a spindle or reel which is rotatably mounted on the housing. The belt is attached to the spindle so that rotation of the reel by a spring winds the belt in a spiral circular coil upon the reel.

Accordingly, the seat belt retractor has a physical size which is somewhat greater than the diameter of the reel with the belt wound thereon. Thus, the retractor will acquire a certain space within the vehicle body and may in some instances, protrude into space which would be otherwise occupied.

Accordingly, it would be desirable to provide an alternate seat belt storage arrangement in which the retractor package size would protrude less into the body.

SUMMARY OF THE INVENTION

The present invention provides a seat belt retractor in which the belt is stored in an elongated hank instead of a circular coil.

More particularly, a seat belt retractor according to the invention includes first and second spindles which are rotatably mounted on a housing in spaced apart parallel relation. The belt has one end looped around the spindles and sewn to itself to form a loop. A wind-up spring acts between one of the spindles and the housing to rotate the one spindle so that the loop of belt orbits the first and second spindles and winds the belt in successive layers in a hank on top the loop. The second spindle is preferably mounted in a slot of the housing to permit movement of the second spindle away from the first spindle. A pair of leaf springs are mounted on the housing and respectively bear against the second spindle to maintain a tension on the loop so that the rotation of the first spindle effects non-slipping orbit of the loop around the spindles. Furthermore, the spindles are preferably coated with a friction material, such as rubber. Thus, the retractor stores the belt in a hank which provides a more elongated but thinner retractor package.

Accordingly, the object, feature and advantage of the invention resides in the provision of a seat belt retractor which winds the belt in a hank about a pair of spaced apart spindles to provide a thin and elongated retractor package.

A further object, feature and advantage of the invention resides in the provision of a belt retractor having spaced apart, parallel spindles coated with a friction material to orbit a loop of belt around the spindles and successively wind layers of the belt in a hank thereabout.

A still further object, feature and advantage resides in the provision of a belt retractor having spring means acting on one of a pair of spaced apart spindles to maintain pressure on a loop of belt surrounding the spindles so that the belt orbits the spindles upon rotation of one of the spindles to store the belt in a hank about the spindles.

DESCRIPTION OF THE PREFERRED EMBODIMENT

Figure 1:
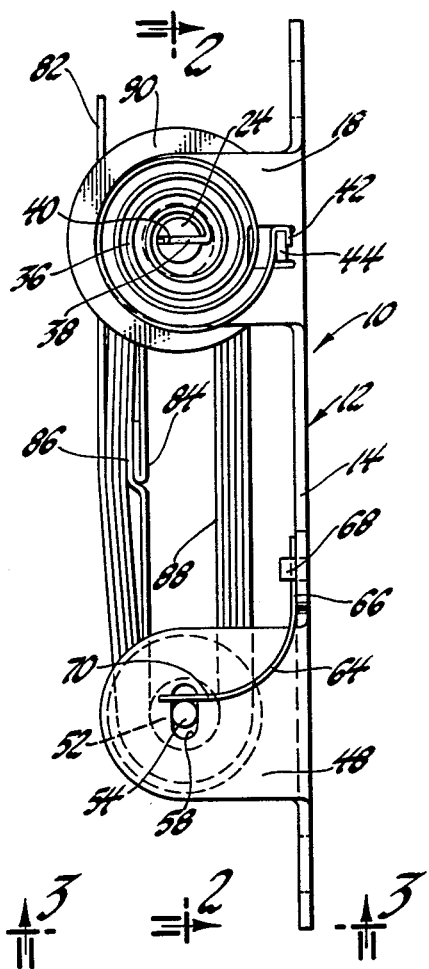
FIG. 1 is a side elevation view of a seat belt retractor according to the invention.
Figure 2:
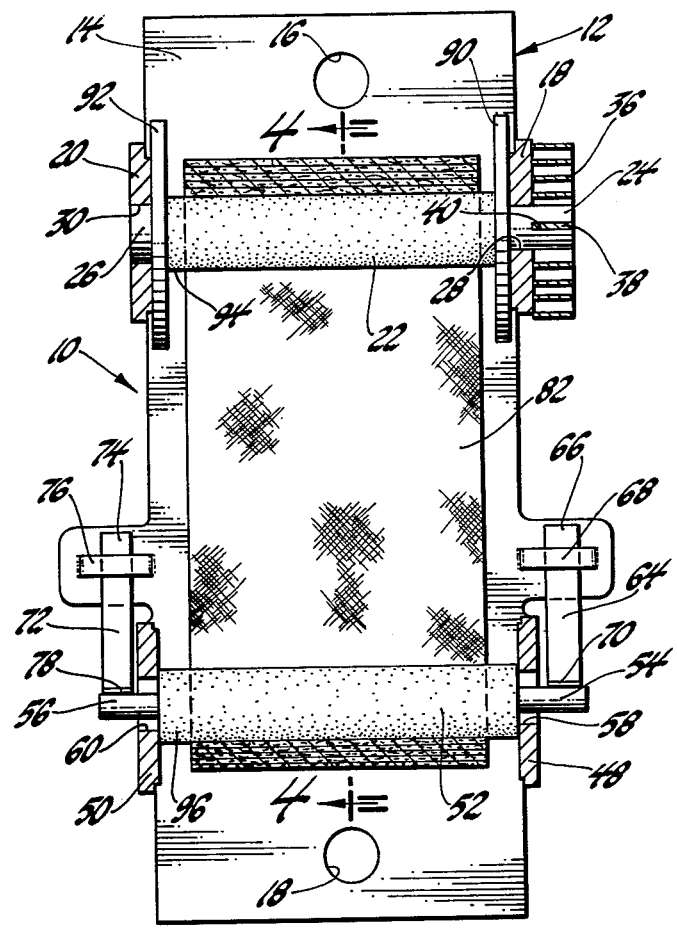
FIG. 2 is a frontal, sectional view of the seat belt retractor taken in the direction of arrows 2—2 of FIG. 1.
Figure 3:
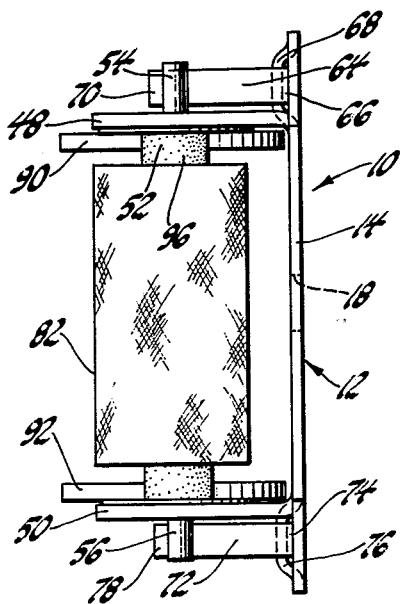
FIG. 3 is an end view of the retractor taken in the direction of arrows 3—3 of FIG. 1.

A seat belt retractor 10 includes a housing 12 having a base 14 adapted for attachment on a vehicle body via mounting bolts which extend through holes 16 and 18 provided in the base 14. The housing 12 also includes side walls 18 and 20 upturned from the opposed edges of the base 14. A spindle 22 extends between the walls 18 and 20 and is rotatably mounted thereon by spindle end portions 24 and 26 which respectively extend through apertures 28 and 30 of the side walls 18 and 20.

A spiral spring 36 acts between the spindle end portion 24 and the housing 12. The spiral spring 36 has an inner end 38 which seats within a slot 40 in the spindle end portion 24. Spiral spring 36 also has an outer end 42 which hooks over a tab 44 lanced from side wall 18.

A second pair of side walls 48 and 50 are upturned from the base 14. A spindle 52 extends between the side walls 48 and 50 and has spindle end portions 54 and 56 which respectively extend through elongated slots 58 and 60 so that the spindle 52 is mounted parallel with the spindle 22 but is permitted limited movement toward and away from the spindle 22.

A leaf spring 64 has a base leg 66 which is anchored beneath a tab 68 of the base 14 and a spring leg 70 which bears against the spindle end portion 54. A leaf spring 72 has a base leg 74 anchored beneath a tab 76 of the base 14 and a spring leg 78 which bears against the spindle end portion 56. The leaf springs 64 and 72 urge movement of the spindle 52 in the direction away from the spindle 22 as permitted by the elongated slots 58 and 60.

Figure 4:
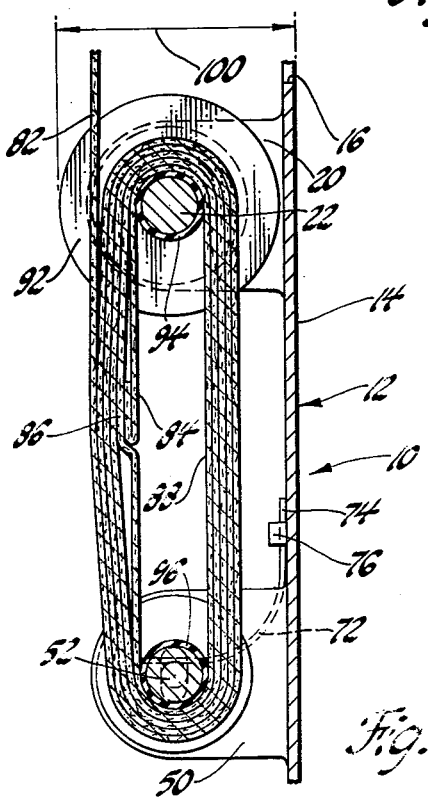
FIG. 4 is a sectional view taken in the direction of arrows 4—4 of FIG. 2.

As best seen in FIGS. 1 and 4, a restraint belt 82 has its end 84 looped around the spindle 22 and spindle 52 and is sewn to the next overlying layer of belt 86 to define a loop of belt 88 which circumscribes the spindles 22 and 52. Belt guide plates 90 and 92 attached to spindle 22 prevent the belt 82 from contacting the housing side walls.

Successive layers of belt are wound on top the initial loop 88 so that a considerable length of belt 82 is stored in a hank around the spindles 22 and 52. The spindles 22 and 52 are preferably covered by rubber coatings 94 and 96 to provide a high coefficient of friction between the spindles and the loop 88.

In operation, the spiral spring 36 biases the spindle 22 in the counterclockwise direction as viewed in FIG. 4. This counterclockwise rotation of the spindle 22 causes the loop 88 to orbit the spindles 22 and 52 and in so doing wind the belt 82 in successive layers. The springs 64 and 72 urge the spindle 52 away from the spindle 22 so that a constant minimum tension is provided on the loop 88 assuring a frictional contact between the loop 88 and the rubber coated spindles 22 and 52.

During extension of the belt 82 from retractor 10, the belt unwinds from the retractor layer-by-layer as the loop 88 orbits the spindles 22 and 52 in the clockwise direction. This clockwise rotation of the spindle 22 winds up the spring 36 to store energy for subsequently rewinding the belt.

It will be understood that the spacing between the spindles 22 and 52 determines the number of layers of belt necessary to store a particular length of belt. In turn, the number of layers of belt determines the thickness of the retractor, designated 100 in FIG. 4.

Accordingly, the invention provides a retractor in which a restraint belt is stored in a hank about spaced apart spindles so that the retractor is an elongated and thin package suited to the available mounting space in a particular vehicle body.

The embodiments of the invention in which an exclusive property or privilege is claimed are defined as follows:

1. A storage retractor for storing a seat belt comprising:
   a housing;
   first and second spindles rotatably mounted on the housing in spaced apart parallel relation;
   the belt having an end circumscribing the first and second spindles and attached to itself to form a loop; and
   a spring acting between one of the spindles and the housing and adapted to rotate the one spindle so that the loop of belt orbits the first and second spindles and winds the belt in successive layers atop the loop and around the first and second spindles.

2. A storage retractor for storing a seat belt comprising:
   a housing;
   first and second spindles rotatably mounted on the housing in spaced apart parallel relation;
   the belt having an end circumscribing the first and second spindles and attached to itself to form a loop;
   a wind-up spring acting between the first spindle and the housing and adapted to rotate the first spindle so that the loop of belt orbits the first and second spindles and winds the belt in successive layers atop the loop and around the first and second spindles; and
   a coating of friction material on at least the first spindle to provide non-slip contact with the loop of belt whereby rotation of the first spindle by the wind-up spring assures orbit of the loop of belt.

3. A storage retractor for stowing a seat belt, comprising:
   a housing having laterally spaced apart side walls;
   a first spindle rotatably mounted between the side walls;
   elongated slots in the first and second side walls;
   a second spindle having end portions extended through the elongated slots to mount the second spindle for rotation upon an axis parallel with the first spindle and to enable movement of the second spindle toward and away from the first spindle;
   the belt having an end looped around the first and second spindles and attached to itself to form a loop;
   a wind-up spring acting between the first spindle and the housing effective to rotate the first spindle so that the loop of belt orbits the first and second spindles and winds successive layers of belt in a hank on top the loop; and
   spring means acting on the second spindle urging movement of the second spindle away from the first spindle to maintain tension upon the loop of belt whereby rotation of the first spindle by the wind-up spring assures orbit of the loop of belt.

* * * * *